Nov. 23, 1937.    H. W. TINKER    2,099,763
METAL TIRE COVER
Filed July 30, 1931    2 Sheets-Sheet 2
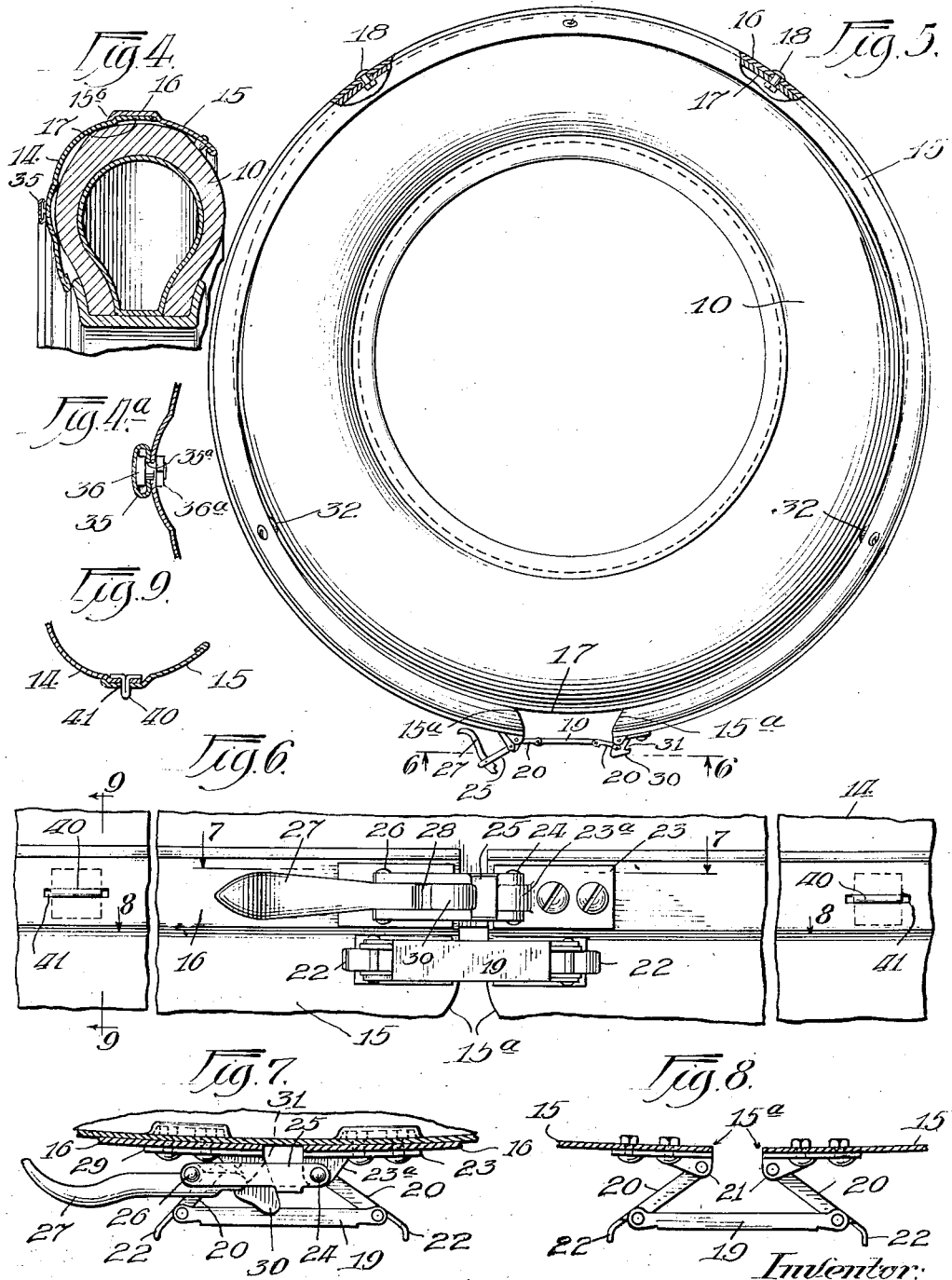

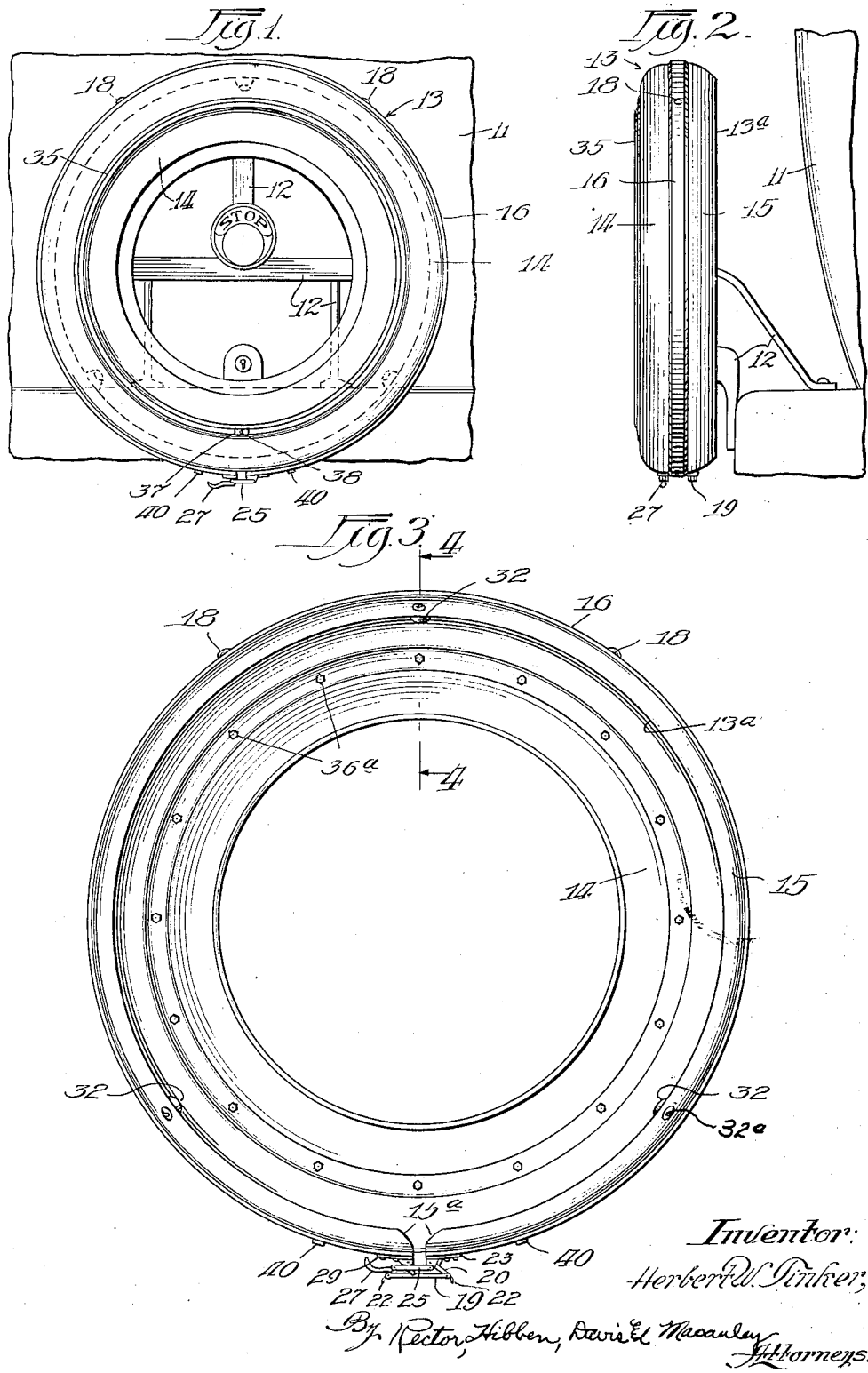

Patented Nov. 23, 1937

2,099,763

UNITED STATES PATENT OFFICE 2,099,763

METAL TIRE COVER

Herbert W. Tinker, Milwaukee, Wis., assignor, by mesne assignments, to Lyon Incorporated, Detroit, Mich., a corporation of Delaware Application July 30, 1931, Serial No. 553,975

6 Claims. (Cl. 150—54)

My invention relates to metal covers for spare tires for automobiles, and the like.

In the use of certain forms of spare tire mountings, it is desirable that the tire cover shield and conceal substantially the entire tire surface, as well as conform rather closely to the shape of the tire, to the end that maximum tire-protection and appearance may be attained; and the principal object of my invention is to provide a novel form of all-metal tire cover embodying these desirable features, which cover is quite simple in construction and inexpensive to manufacture.

Another, and more specific, object is to provide an all-metal cover having transverse and circumferential curvatures similar to the transverse and circumferential curvatures of the tire with a transverse dimension sufficient to extend the annular edges of the cover substantially laterally beyond and inwardly (radially) of the circumferential center line of the tread, which cover embodies a pair of connected sections,—one section being of fixed size and substantially rigid covering a face and a portion of the tire tread, and the other section being flexible and covering the remainder of the tire tread, both of said sections normally, fitting freely upon the tire and the flexible section being adjustable in size for securement of the cover as a whole upon the tire.

Another object is to provide a cover of the foregoing character wherein the size-fixed section is completely circular and continuous and the adjustable section takes the form of a split ring which is expansible and contractible radially with respect to the tire, suitable draw-clamp means being associated with the free ends of such ring for drawing its ends together to effect securement of the cover upon the tire.

Further objects are to provide a cover of the foregoing character wherein the adjacent annular edges of sections overlappingly interlock with each other and are arranged to provide a sealed joint therebetween when the flexible section is moved into its cover-holding position; to provide means insuring movement of the cover sections into the proper overlapping position in adjusting the cover to and securing it upon the tire; and to provide means for limiting the extent of separation of the free ends of the adjustable or flexible cover section and for holding such ends in a predetermined spaced relation for ready application of the cover to and fitting of the same upon the tire.

Other objects and advantages will become apparent as this description progresses and by reference to the drawings, wherein—

Figure 1 is a front-elevational view of one form of tire and cover assembly embodying my invention, the tire mounting in this instance being at the rear of an automobile;

Fig. 2 is a side elevational view of the structure shown in Fig. 1;

Fig. 3 is an enlarged rear elevational view of the cover structure shown in Fig. 1, as it would appear when removed from the tire;

Fig. 4 is a section taken substantially on line 4—4 of Fig. 3, but illustrated in position upon a tire;

Fig. 4a is an enlarged fragmentary section of the front portion of the cover shown in Fig. 4;

Fig. 5 is an enlarged rear-elevational view of a tire having a cover embodying my invention assembled thereon, the flexible or adjustable ring section being shown in its open-position permitting the cover to be readily applied to and removed from the tire;

Fig. 6 is an enlarged section taken substantially on line 6—6 of Fig. 5;

Fig. 7 is a section taken substantially on line 7—7 of Fig. 6;

Fig. 8 is a section taken substantially on line 8—8 of Fig. 6; and

Fig. 9 is a reduced section taken substantially on line 9—9 of Fig. 6.

It will be understood that while I have illustrated, and will describe my invention as applied to a spare tire mounted at the rear of an automobile, I do not wish to be limited to such an arrangement since it is obvious that my invention may well be applied to a tire mounted in any other position, such as at the side of the automobile.

Referring particularly to the drawings, the tire 10 is carried at the rear of the automobile 11 by suitable bracket structure 12 which may take any convenient form. The tire is protected by an all-metal cover (designated generally at 13 in Fig. 1) which passes completely around the circumferential part of the tire, over the outer face thereof and transversely over and behind and radially inward of the tread portion of the tire. The cover, when secured upon the tire, conforms closely to the circumferential and transverse curvatures of the tire with its rear edge 13a (Fig. 2) of considerably less diameter than the maximum diameter of the tire tread, whereby the cover is securely held in position upon the tire and cannot be accidentally removed or displaced. The cover is so shaped, as will be observed from Figs. 2 and 4, that practically all of the outwardly-exposed portion of the tire is covered, this being true regardless whether the tire be mounted in a substantially vertical position as shown in the drawings or whether it be mounted in an inclined position such as is customary in the use of certain forms of automobile bodies. This concealment of the tire not only effectively protects it from the weather but adds materially to the appearance of the automobile as a whole.

Now referring more specifically to the construction of the cover, it comprises a pair of sections which I may term "front" and "rear", respectively. The front section 14 is formed continuous and completely circular with substantially the same circumferential curvature as that of the tire to which it is adapted. It has a transverse curvature (see Fig. 4) approximating that of the tire face and substantially one-half of the tire tread portion so as to fit over and conceal one face of the tire and substantially one-half of the tire tread. The relative dimensions of this section of the cover are such that it will fit freely over the front portion of the tire, to the position indicated in Fig. 4, and, due to its shape, will remain substantially rigid.

The other, or rear, cover section 15 takes the form of a substantially circular rim or ring which is split providing free ends 15ª. This section is formed of sheet metal so that being split transversely, it will readily flex in radial directions. This section has a transverse curvature corresponding to substantially the transverse curvature of the adjacent portion of the tire; and it also has a transverse dimension such as will extend its rear edge 13ª beyond and radially inward of the tire tread portion with its forward edge 15ᵇ in overlapping relation with the section 14.

The forward edge of section 15 is provided with a circumferential, outwardly-pressed rib or bead 16 providing an annular groove in which is adapted to nest the similarly-formed rib or bead 17 of the front section 14. These overlapping or nested-rib portions of the sections 14 and 15 are so related that they fit snugly together and, as will be observed from Fig. 4, are so relatively shaped that they tend to prevent entry of rain, dirt, etc., past the joint between such sections as well as give to the cover a one-piece appearance.

To facilitate handling of the cover, I fixedly secure the sections 14 and 15 together, preferably, by a pair of bolt-and-nut devices 18, or the like, at points slightly to one side of the vertical center line of the tire and at a point substantially diametrically opposite the split ends 15ª of the section 15. In this way, the flexing of the section 15 is not interfered with and the cover may be easily handled as a unitary structure.

In Fig. 5, I have illustrated the cover in position upon a tire and before the section 15 has been flexed or drawn into its cover-securing position. It will be noted that the free ends 15ª of this section (and the adjacent portions of the section) are flexed outwardly away from the tire tread permitting of ready application of the cover to the tire. To facilitate application of the cover to the tire, the ends 15ª of section 15 may be held in an open or spread-apart position by means which may take the form of a link member 19 having its opposite ends bifurcate for pivotal connection to links 20 which are, in turn, pivoted to brackets 21 carried by the opposite section ends 15ª, preferably, immediately adjacent the rib 16. To limit the swing of the link structure in end-spreading direction, the links 20 have their ends extended centrally as at 22 to engage the outer surface of the link 19 when in the full-open position shown in Fig. 5. In this manner the extent of spreading of the section ends 15ª is not only limited, but such ends are held against movement toward each other until the link structure is collapsed as illustrated in Figs. 6, 7 and 8. Obviously, the section 15 may be so formed that its ends 15ª may be spaced apart a lesser or greater distance than that permitted by the particular link structure 19—21, and this link structure may or may not be utilized as a spreading means for expanding the section 15 radially beyond its normal, free spread,—all without departing from my invention. If desired, a flexible cable of desired form may be substituted for the link structure 19—21, such cable being suitably connected to the opposite section ends 15ª.

To fasten the cover upon the tire, I employ a draw-clamp structure which may take any suitable form such as that illustrated in Fig. 6. Specifically, this draw-clamp comprises a bracket 23 secured to the section rib 16 at one end 15ª. This bracket has an outwardly projecting lug 23ª to which is pivotally connected, as at 24, the bifurcate end of a latch-link member 25. In the other, and bifurcate, end of the link member 25, there is pivotally mounted as at 26 a draw-lever 27, the bifurcation at this end of the link 25 being sufficiently deep to provide inwardly of the lever 27 a latch-slot 28. The opposite end 15ª of the cover section 15, along its rib surface 16, supports another bracket 29 having an outwardly projecting latch-lug 30 which is provided with a latch-notch 31 in its inward side edge. The latch-slot 28 is of sufficient length to receive the projection 30, permitting the inner and rounded end of the lever 27 to engage in the notch 31. As will be obvious from Fig. 7 when the clamp parts are adjusted so that the projection 30 extends through the slot 28 and the lever 27 is engaged in the notch 31 and swung downwardly to a position substantially parallel with the adjacent surface of section 15, the ends 15ª are drawn together. The relation of the several link pivots just described is such that as illustrated in Figs. 6 and 7, the clamp structure will remain in its closed position until the lever 27 is raised to disengage link 25 from projection 30.

It will be obvious from the foregoing that, after the cover has been placed upon the tire in the position illustrated in Fig. 5, the draw-clamp may be actuated to bring the ends of the sections 15 together and to adjust the cover into close fitting relation to the tire.

To insure a close fit of the section 15, and the cover as a whole, to the tire, and to prevent shifting of the cover upon the tire, I, preferably, employ a plurality of rubber bumpers or buttons 32 which are located around the inner periphery of the section 15. These bumpers or buttons may be secured to the section 15 in any desired manner, as by a bolt-and-nut device 32ª countersunk within the buttons 32 in such a way as to prevent contact of metal with the tire. When the section 15 is closed upon the tire as above explained, these bumpers or buttons seat against the tire as illustrated in Fig. 4.

The foregoing adjustment of the section 15 not only closes the same down upon the tire, but also clamps it tightly upon the front section 14. As hereinabove explained, the rib and groove constructions 16 and 17 which overlap each other in the assembled position of the cover, extend around the entire circumference of the sections and these portions of the sections, when the section 15 is drawn down by the draw clamp, are tightly seated together. This positively insures against weather, dirt, etc., entering within the cover through the joint between these sections.

To provide for readiness and ease in adjustment of the two cover sections, into their proper overlapping position, and to insure that they will always assume such position when the above-described draw-clamp structure is actuated, I provide the following: The lower part of rib 17 of section 14 is provided with at least two circumferentially-extending slots through which project the section guide and positioning members 40. These members may be formed of a flat piece of metal bent upon itself with its ends bent laterally (Fig. 9) giving it a T-shape in cross-section. The T-head, or laterally bent arms, of these members may be secured to the under side of the rib 17 by welding, riveting, or in any other desired manner. The rib 16 of the other section is provided with slots 41 corresponding in number to the members 40. These slots are located to align with the projecting T-stem portions of the members 41 and they are of slightly larger dimension than such projecting portions so that the latter will readily pass therethrough. From the foregoing it is obvious that in applying the cover to a tire, the sections cannot be brought together for securement of the same upon the tire without engaging the members 40 in the slots 41; and, with the members 40 and slots 41 positioned as shown and described, the sections when brought together will be in the proper overlapping position.

From the foregoing, the manner of application of my tire cover to the tire will be obvious. To remove the cover, it is only necessary to throw the lever 27 outwardly from the cover and disengage the link 25 from the projection 30, whereupon the ends 15ª of the section 15 tend to spring apart and free the cover from the tire. The ends of this section may be spread further apart for free removal and may be held in a spread position by the link structure 19—22.

In certain instances, it may be desirable to employ a plated bead or similar decorative means around the outer face of the cover. I may provide for this by using a split, flat-like, tubular ring 35 slotted as at 35ª (Fig. 4a) to receive and retain the heads of bolts 36 which pass through the adjacent cover surface to receive nuts 36ª. The splitting of this bead-ring facilitates entry of the bolt heads which, by such arrangement, are concealed. The split ends of this ring 35 are concealed by a similarly-shaped splice piece 37 which overlaps the ring ends and is secured to the cover by a bolt-and-nut device 38. Furthermore, if desired, the rib 16 of section 15 may be plated or otherwise treated for decorative purposes.

It will be understood that while I have shown and described only one form of my invention, other changes in details and the arrangement of parts may be made without departing from the spirit and scope of my invention as defined by the claims which follow.

I claim:

1. In a unitary metal tire cover, a pair of sections, one completely circular and continuous, and the other circular and transversely split providing free ends adjustable toward and from each other, said two sections being connected together only at a point diametrically opposite said free ends and having their adjacent annular edges pressed outwardly to form hollow ribs adapted to nest one within the other, means associated with said split section for drawing its free ends together to secure said ribs in nested relation, and means for guiding and holding said sections into a predetermined rib-nested position as said first means is actuated.

2. In a unitary metal tire cover, a pair of sections, one completely circular and continuous, and the other circular and transversely split providing free ends adjustable towards and from each other, the transverse dimensions of said sections being such that their adjacent annular edges overlap, means associated with said split section for drawing its free ends toward each other to secure said sections in overlapping relation upon the tire, and a guide and positioning member carried by the overlapping portion of one of said sections and the overlapping portion of the other of said sections having a slot aligned with said member and to receive the latter for guiding said sections into and holding them in a predetermined overlapping position as said means is actuated.

3. In a spare tire cover, a pair of cooperable circular sections, one being formed to be disposed over an outer side of a spare tire and over a portion of the tire tread and the other being split and formed of resilient material to be disposed over the remaining portion of the tire tread leaving the rear side of the tire uncovered, said split section being normally of a diameter greater than that of the tire, said sections having their adjacent annular marginal portions provided with nesting edges, resilient tread contacting means on the interior of said split section and means associated with said split section for drawing its free ends together to secure said edges in nested relation and to bring said resilient means into engagement with the rear portion of the tire tread to hold the split section in tight cooperation with the tire, said drawing means including a manually operable lever for contracting said split section against the resiliency of the material comprising the same so that upon the release of said lever said ends will spring apart.

4. In a spare tire cover, a pair of cooperable circular sections, one being formed to be disposed over an outer side of a spare tire and over a portion of the tire tread and the other being split and formed to be disposed over the remaining portion of the tire tread leaving the rear side of the tire uncovered, said sections having their adjacent annular marginal portions provided with nesting edges, resilient tread contacting means on the interior of said split section and means associated with said split section for drawing its free ends together to secure said edges in nested relation and to bring said resilient means into engagement with the rear portion of the tire tread to hold the split section in tight cooperation with the tire, said sections being fastened together at only a single point located diametrically opposite said drawing means.

5. A unitary tire cover made of a shape retaining material and comprising substantially circular face and rear sections, the face section including an unsplit face ring and a semi-tread portion, the rear section being in the form of a split expansible and contractible ribbon-like resilient semi-tread strip considerably more than 180° in length, and means joining the sections at a point diametrically opposite the split in the rear section, and constructed to prevent relative movement between the sections in planes parallel to the plane of the tire, and to permit only a slight and limited relative movement, between the sections, in an arcuate path, and about the means as a fulcrum.

6. In a metal tire cover, the combination of a side wall cover member, an open-ended tread cover member, said tread cover member having a tendency to resiliently expand to a radius greater than that of the tire to be covered, means to limit the resilient expansion of said tread cover member, and latch means pivotally attached to said open ends to removably secure said tread cover member in compressible relation with said tire, both of said cover members being secured to each other at a point approximately opposite said open end.

HERBERT W. TINKER.